Patented July 2, 1946

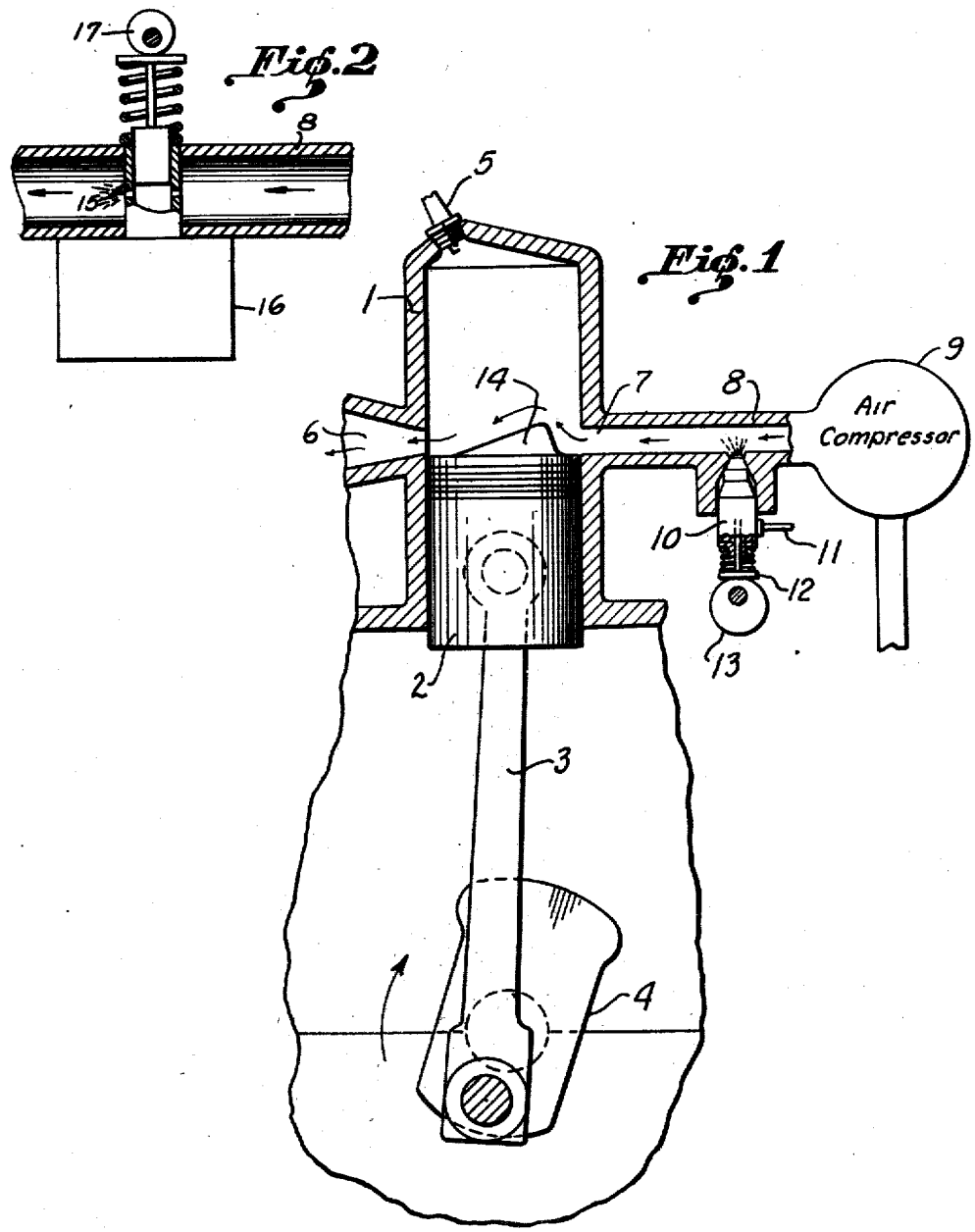

2,403,106

UNITED STATES PATENT OFFICE 2,403,106

TWO-CYCLE INTERNAL-COMBUSTION ENGINE

Marion Mallory, Detroit, Mich.

Application October 30, 1943, Serial No. 508,299

6 Claims. (Cl. 123—65)

This invention relates to a two-cycle internal combustion engine.

It is the object of this invention to produce a two-cycle internal combustion engine which operates more efficiently than those presently known. This object is achieved by timing the injection or admittance of fuel to take place slightly later than the opening of the intake and exhaust ports by the piston so that air will start to force out the exhaust gases before fuel is admitted to prevent the fuel from being admitted to the burning mixtures and also prevent fuel from escaping out of the exhaust.

Fig. 1 is a section through my two-cycle engine.

Fig. 2 is a detail view of the carburetor for supplying a carbureted charge to the engine.

Referring more particularly to the drawing the two-cycle engine comprises a cylinder 1, a reciprocating piston 2, connecting rod 3 and crankshaft 4.

The exhaust port is designated 6 and the intake port 7. The intake port 7 is connected by means of a pipe 8 with a source of air under pressure. If desired, this source of air under pressure can be an air compressor 9 shown diagrammatically. The fuel pipe 8 is provided with an injection nozzle 10 that can be connected to an injection pump where the fuel is forced in under pressure, or the fuel nozzle 15 can be connected to a carburetor fuel bowl 16 and the nozzle can be opened and closed by a cam 17 so that the air compressor will blow the fuel in at the desired intervals. The fuel nozzle is controlled by a valve 12 operated by a cam 13. Cam 13 is operated off of the engine and arranged to open the valve 12 to admit fuel into the fuel pipe and cylinder slightly after the piston 2 clears or opens the intake port 7. The injection preferably is completed and the valve 12 of the nozzle closed slightly before the piston 2 closes the intake port 7.

In the operation of the engine the source of air under pressure is at all times connected with intake port 7. As soon as the piston on the down stroke uncovers the exhaust and intake ports, air under pressure is forced into the cylinder through intake port 7 where it is deflected upwardly by the head 14 of the piston to assist in the scavenging of the exhaust gases out of the cylinder through exhaust port 6. As shown, the piston 2 has opened the intake and exhaust ports on the down stroke and has started on its upward stroke. The cam 13 is timed so that it opens the nozzle 10 and permits fuel to be admitted into the fuel pipe and cylinder slightly later than the opening of the intake and exhaust ports by the piston. By thus slightly delaying the injection of the fuel into the cylinder, sufficient time is given to permit the exhaust flame to burn out or become extinguished and to permit the air under pressure to partly scavenge the exhaust gases from the cylinder before a fresh charge of raw fuel is injected into pipe 8 preparatory to flowing into the cylinder. This prevents any fuel from passing into the cylinder while the flame exists and from escaping out of the exhaust which increases the efficiency of the engine. The admittance of the fuel from nozzle 10 will be completed slightly before the intake port 7 is closed on the upstroke of the piston.

I do not wish to be limited to using the two ports for intake and exhaust. If desired, an exhaust valve can be used on top of the cylinder head in place of port 6 to control a port timed to open as the exhaust port 6 opens, or an intake port can be used on top of the cylinder head in place of port 7 controlled by valve timed to open as port 7 is opened. In other words, if the exhaust port was in the cylinder head, the intake port would remain in the same location as shown at 7, and if the intake port was in the cylinder head, the exhaust port would remain in the same location as shown in the drawing.

I claim:

1. A two-cycle internal combustion engine comprising a cylinder, a reciprocating piston in said cylinder, intake and exhaust ports controlled by said piston, a source of air under compression connected to said intake port whereby air under pressure flows into the cylinder as soon as the piston uncovers the intake and exhaust ports, and means for forcing a fuel and air mixture into the cylinder through said intake port slightly after the intake ports are opened and while said exhaust port is open.

2. A two-cycle internal combustion engine comprising a cylinder, a reciprocating piston in said cylinder, intake and exhaust ports controlled by said piston, a source of air under compression connected to said intake port whereby air under pressure flows into the cylinder through said intake port as soon as the piston uncovers the intake and exhaust ports, and a fuel injector for injecting fuel into the stream of air under high pressure before it passes through the intake port, said injection occurring while the intake and exhaust ports are open and after the flame in the cylinder has died out.

3. A two-cycle internal combustion engine comprising a cylinder having intake and exhaust ports, a piston for controlling said ports so that they open and close substantially simultaneously, a source of air under compression connected to said intake port, means on said piston for deflecting the air under pressure upwardly and away from the exhaust port as said air is forced into the cylinder through said intake port, and a fuel nozzle from which the compressed air stream draws fuel preparatory to passing into the cylinder while the exhaust port is open and after compressed air free of fuel has been forced into the cylinder through said intake port.

4. A two-cycle internal combustion engine comprising a cylinder having intake and exhaust ports, a piston reciprocating in said cylinder and arranged to open and close the intake and exhaust ports substantially simultaneously, a fuel pipe connecting the intake port with a source of air under compression, an injection nozzle for injecting fuel into said fuel pipe preparatory to passing through said intake port, and means controlling said injection nozzle whereby the fuel is injected into the compressed air stream while the exhaust port is open and after compressed air free of fuel has been forced into the cylinder and the flame extinguished.

5. A two-cycle internal combustion engine comprising a cylinder having intake and exhaust ports, a source of air under pressure connected to said intake port whereby air under pressure flows into said cylinder when the intake and exhaust ports are open to scavenge said cylinder, and means for supplying fuel into said cylinder while both said ports are open and after said air under pressure has begun to flow into said cylinder and before said air under pressure ceases to flow into said cylinder.

6. A two-cycle internal combustion engine comprising a cylinder, a reciprocating piston in said cylinder, intake and exhaust ports, valve means controlling said ports, a source of air under compression connected to said intake port whereby air under pressure flows into the cylinder as soon as the valve means uncover the intake and exhaust ports, and a carburetor from which fuel is drawn into the air stream by said air stream before it passes through the intake port and while the intake and exhaust ports are open and after the flame in the cylinder has died out.

MARION MALLORY.

---

Certificate of Correction

Patent No. 2,403,106.

July 2, 1946.

MARION MALLORY

It is hereby certified that error appears in the printed specification of the above numbered patent requiring correction as follows: Column 2, line 38, claim 1, after "intake" insert the words *and exhaust*; and that the said Letters Patent should be read with this correction therein that the same may conform to the record of the case in the Patent Office.

Signed and sealed this 24th day of September, A. D. 1946.

[SEAL]

LESLIE FRAZER,
*First Assistant Commissioner of Patents.* they open and close substantially simultaneously, a source of air under compression connected to said intake port, means on said piston for deflecting the air under pressure upwardly and away from the exhaust port as said air is forced into the cylinder through said intake port, and a fuel nozzle from which the compressed air stream draws fuel preparatory to passing into the cylinder while the exhaust port is open and after compressed air free of fuel has been forced into the cylinder through said intake port.

4. A two-cycle internal combustion engine comprising a cylinder having intake and exhaust ports, a piston reciprocating in said cylinder and arranged to open and close the intake and exhaust ports substantially simultaneously, a fuel pipe connecting the intake port with a source of air under compression, an injection nozzle for injecting fuel into said fuel pipe preparatory to passing through said intake port, and means controlling said injection nozzle whereby the fuel is injected into the compressed air stream while the exhaust port is open and after compressed air free of fuel has been forced into the cylinder and the flame extinguished.

5. A two-cycle internal combustion engine comprising a cylinder having intake and exhaust ports, a source of air under pressure connected to said intake port whereby air under pressure flows into said cylinder when the intake and exhaust ports are open to scavenge said cylinder, and means for supplying fuel into said cylinder while both said ports are open and after said air under pressure has begun to flow into said cylinder and before said air under pressure ceases to flow into said cylinder.

6. A two-cycle internal combustion engine comprising a cylinder, a reciprocating piston in said cylinder, intake and exhaust ports, valve means controlling said ports, a source of air under compression connected to said intake port whereby air under pressure flows into the cylinder as soon as the valve means uncover the intake and exhaust ports, and a carburetor from which fuel is drawn into the air stream by said air stream before it passes through the intake port and while the intake and exhaust ports are open and after the flame in the cylinder has died out.

MARION MALLORY.

---

Certificate of Correction

Patent No. 2,403,106.   July 2, 1946.

MARION MALLORY

It is hereby certified that error appears in the printed specification of the above numbered patent requiring correction as follows: Column 2, line 38, claim 1, after "intake" insert the words *and exhaust*; and that the said Letters Patent should be read with this correction therein that the same may conform to the record of the case in the Patent Office.

Signed and sealed this 24th day of September, A. D. 1946.

[SEAL]

LESLIE FRAZER,
*First Assistant Commissioner of Patents.*